(12) United States Patent
Claisse et al.

(10) Patent No.: US 6,419,872 B1
(45) Date of Patent: Jul. 16, 2002

(54) METHOD OF MANUFACTURING A PART HAVING A MECHANICALLY WEAKENED AREA FORMING A HOLE OR A HOLE PRECURSOR

(75) Inventors: Jean-Jacques Claisse, Crepy-en-Valois; Christophe Albert; Paul Dumon, both of Senlis, all of (FR)

(73) Assignee: Plant Wattohm, Senlis (FR)

( * ) Notice: Subject to any disclaimer, the term of this patent is extended or adjusted under 35 U.S.C. 154(b) by 0 days.

(21) Appl. No.: 09/519,615

(22) Filed: Mar. 6, 2000

(30) Foreign Application Priority Data

Jan. 24, 2000 (FR) ............................................ 00 00850

(51) Int. Cl.⁷ ............................. B06B 1/02; B29C 69/00
(52) U.S. Cl. ...................... 264/443; 264/138; 264/145; 264/154; 264/155; 264/156; 264/444
(58) Field of Search ................................. 264/138, 145, 264/154, 155, 156, 442, 443, 444

(56) References Cited

U.S. PATENT DOCUMENTS

| | | |
|---|---|---|
| 3,389,431 A | 6/1968 | Kelly |
| 4,104,349 A | 8/1978 | Hillgenberg |
| 4,391,426 A | 7/1983 | Göthberg |

FOREIGN PATENT DOCUMENTS

| | | |
|---|---|---|
| DE | 2 212 355 B | 8/1973 |
| FR | 98 13984 | 11/1998 |

OTHER PUBLICATIONS

Patents Abstracts of Japan, Chiba, Publication No. 05116219, Publication Date, May 14, 1993, "Ventilation Heat Caulking Method For Plastic Electronic Component".

*Primary Examiner*—Leo B. Tentoni
(74) *Attorney, Agent, or Firm*—Browdy and Neimark, P.L.L.C.

(57) ABSTRACT

A method of manufacturing a part having at least one mechanically weakened area includes a step of producing a thermoplastics material part and at least one cycle of steps entailing forming a localized opening through an area of the part, heating the part locally by means of a heating probe so as to render the aforementioned area of the part plastic, and using a punch to modify the geometry of the area rendered plastic so as to delimit in the part a mechanically weakened area constituting a hole or hole precursor.

19 Claims, 3 Drawing Sheets

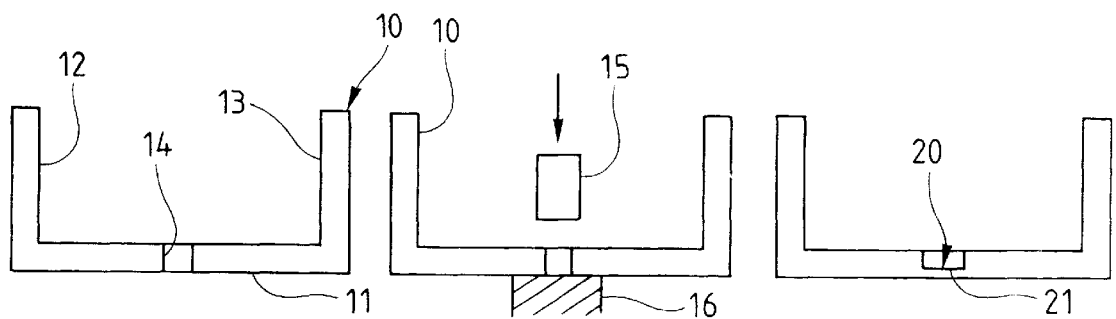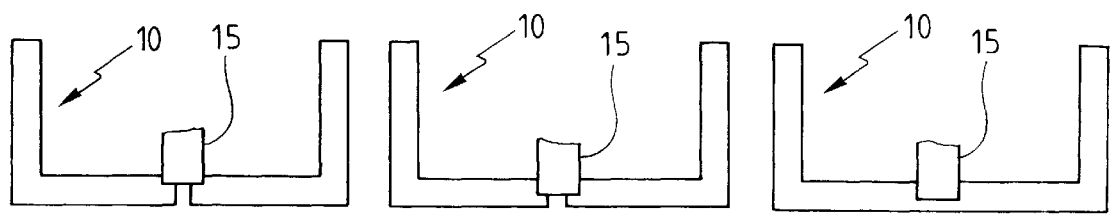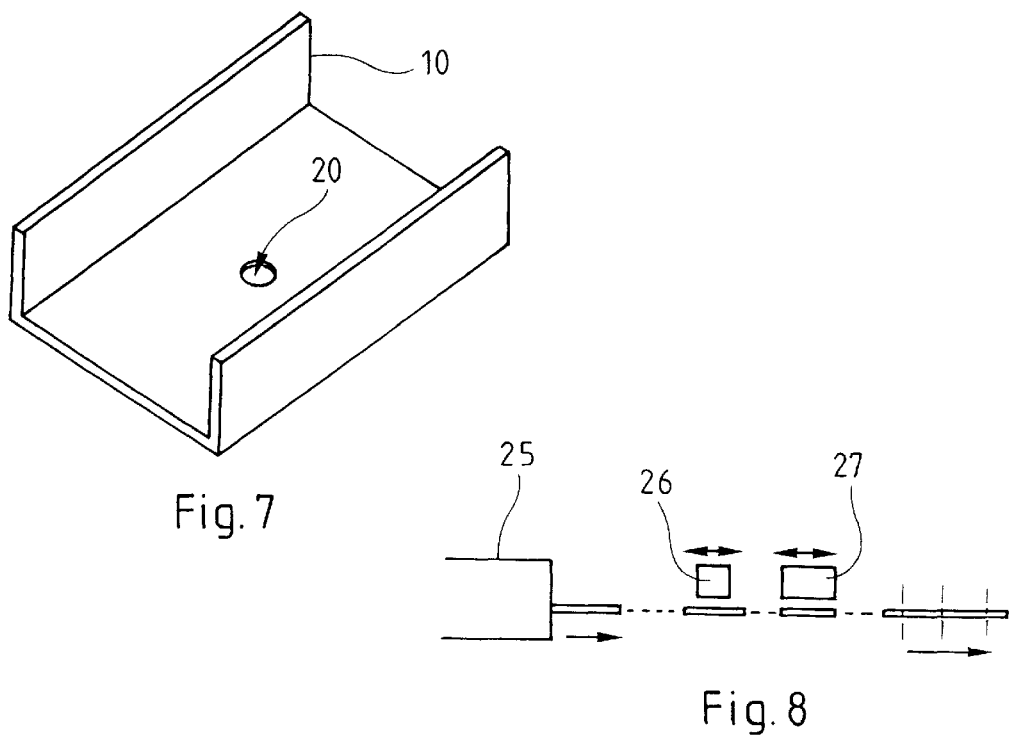

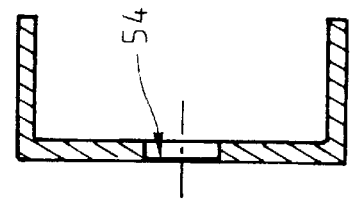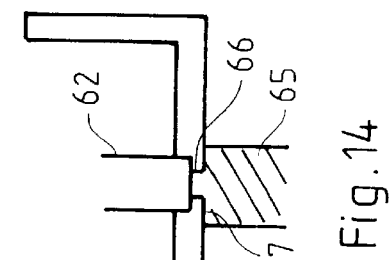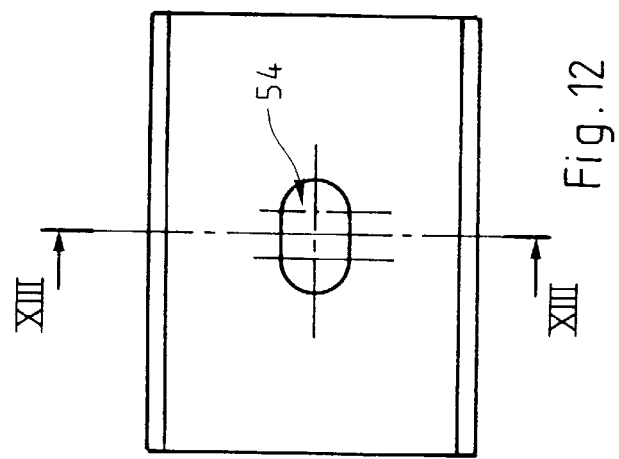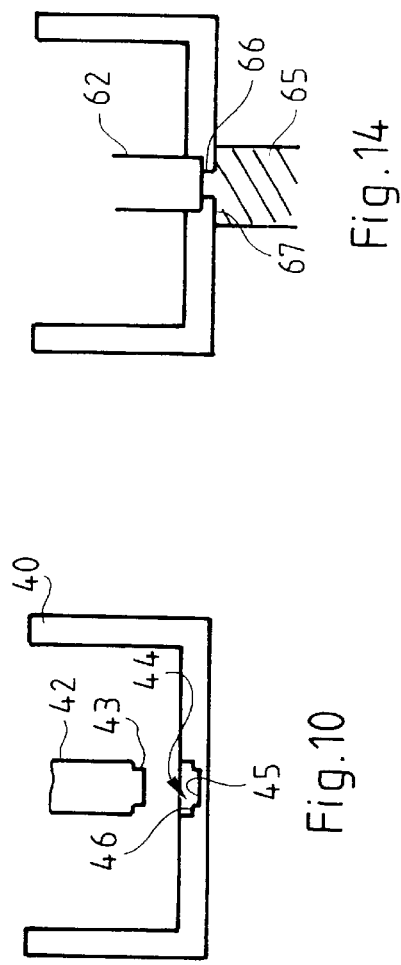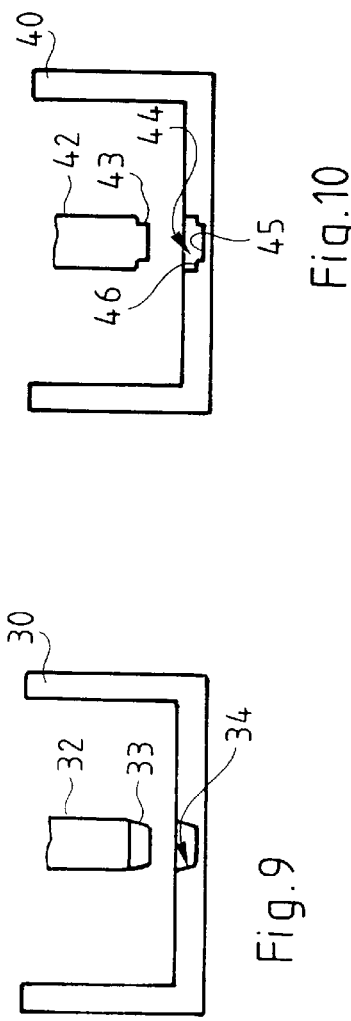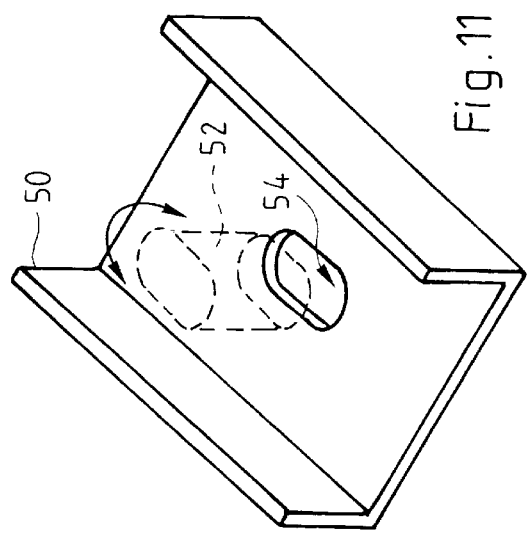

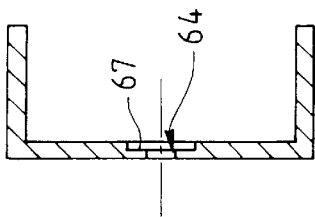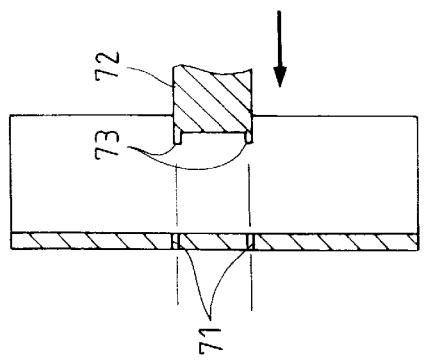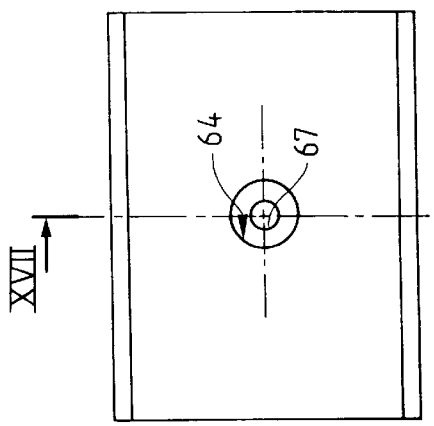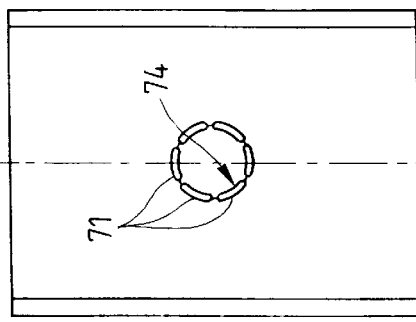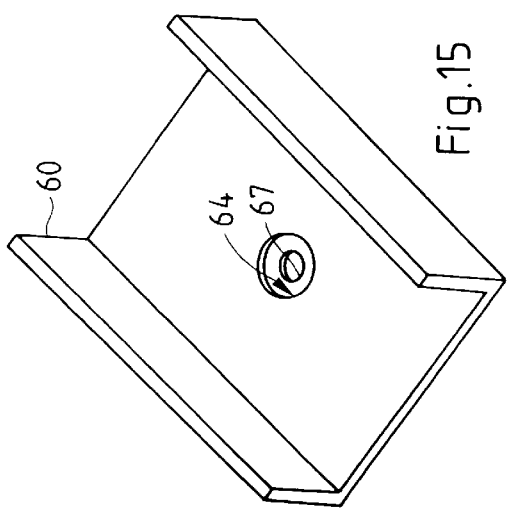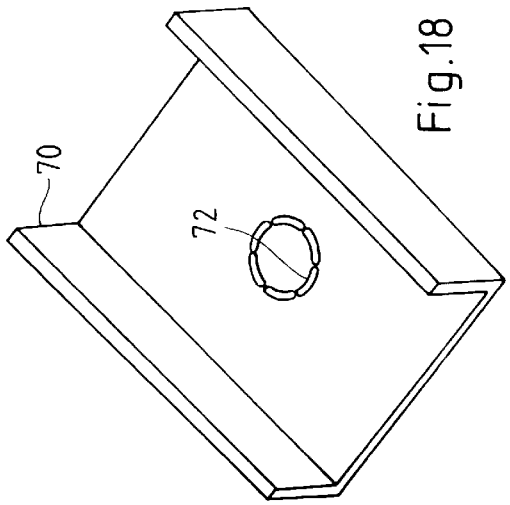

METHOD OF MANUFACTURING A PART HAVING A MECHANICALLY WEAKENED AREA FORMING A HOLE OR A HOLE PRECURSOR

BACKGROUND OF THE INVENTION

1. Field of the Invention

The invention relates to the manufacture of plastics material parts having at least one mechanically weakened area forming a hole or a hole precursor.

It is directed in particular, although not exclusively, to the manufacture of plastics material sections incorporating a longitudinal succession of holes or hole precursors intended to enable easy fixing of the sections in use. These sections are advantageously sections constituting or forming part of electrical wiring trunking.

As used herein the expression "hole precursor" (the concept of a "preform" could equally well be used) means a hole that is imperfectly formed, constituted by an area that is mechanically weakened relative to the remainder of the part concerned; a mechanically weakened area of this kind can in particular be a hole formed in only part of the local thickness of the part concerned, a hole having over a portion of its depth a web including a constriction of its cross section which is generally concentric with the hole and intended to be destroyed when a fixing member is inserted, or a mechanically weakened contour separating from the remainder of the part a central portion which is intended to be eliminated in use; the aforementioned features can be combined, for example, with a blind hole including a cross section constriction and the bottom of which has a mechanically weakened contour. The mechanically weakened area can have an oblong section and can constitute a hole with a spot facing.

The benefit of providing a hole precursor in the form of a blind hole, rather than a through-hole, is that the user is free to use only some of the hole precursors to fix the part concerned, for example, without the unused precursors constituting traps for impurities or dust or even compromising the sealing of the internal volume of the part; this benefit is particularly significant in trunking, for example electrical wiring trunking, which is required to be as well sealed as possible from the external environment (this applies in particular to electrical wiring trunking intended for use in wet areas in the home).

If the hole precursor is open, the seal is not preserved so well, but the existence of constrictions in the hole precursors facilitates centering fixing members (usually screws) in the hole precursors which are used in service.

The fact of providing hole precursors constituted of mechanically weakened contours is that the areas of the parts containing the hole precursors that are not used in service are more rigid than if the holes were formed completely, which is combined with facilitating the fitting of fixing members into the precursors that are actually used.

The benefit of oblong hole precursors is that they can have a cross section larger than the cross section of the fixing members eventually used and enable the user to choose the location of the fixing hole within the oblong precursor.

The benefit of spot facings (recessed bearing surfaces which are permanent) is well known; in particular, it enables the head of a fixing screw to be accommodated within the thickness of the part.

2. Description of the Prior Art

The skilled person knows how to make hole precursors or holes with spot facings in plastics material parts. In particular, the skilled person knows how to manufacture parts by injection molding with fixed projections or more usually mobile slides incorporated into the design of the mold parts. However, this approach, whereby the spot-faced holes or the hole precursors are formed as soon as the plastic material is shaped, makes it necessary to design the molds accordingly and is applicable only to injection molded parts whose geometry allows this.

The object of the invention is to provide a method of manufacturing plastics material parts with mechanically weakened areas forming holes or hole precursors (in practice a greater number of such holes or hole precursors than is necessary for using the parts), wherein the mechanically weakened areas are formed esthetically and easily, at moderate cost, after the parts (or at least blanks therefor) are produced, and in a manner that is both reproducible and reliable.

SUMMARY OF THE INVENTION

To this end, the invention proposes a method of manufacturing a part having at least one mechanically weakened area, the method including a step of producing a thermoplastics material part and at least one cycle of steps entailing forming a localized opening through an area of the part, heating the part locally by means of a heating probe so as to render the area of the part plastic, and using a punch to modify the geometry of the area rendered plastic so as to delimit in the part a mechanically weakened area constituting a hole or hole precursor.

Thus, in accordance with the invention, the mechanically weakened area is conformed by deforming a plastic area of the part using a punch whose shape determines the shape of the mechanically weakened area after cooling. The punch causes plastic flow of the material, in practice against a counter-punch which can be flush with the surface of the part on the opposite side to the punch. Thus the part is not punched right through but through only a part of its thickness, there remaining material afterwards in line with the punch (considering its largest cross section).

The benefit of the opening is in particular to avoid the creation of an increase in thickness on producing the mechanically weakened area as the result of displacement of material during punching; the fact that the opening is a through-opening (with a section that in practice is constant) corresponds to a simple and reproducible manner of forming a opening.

For the plastics material to flow in a homogeneous manner, the area rendered plastic is preferably formed around the opening.

The hole precursor can have several conformations.

In a first conformation, the geometry of the area rendered plastic is modified to delimit the mechanically weakened area in the form of a blind hole the bottom of which is constituted of a continuous web. This web guarantees that unused hole precursors are sealed. The web is preferably flush with the surface of the part on the side opposite the punch, in which case it is not necessary to provide a counter-punch of particular shape (a simple plane surface can be used).

In another, advantageous conformation, the geometry of the area rendered plastic is modified to delimit the mechanically weakened area in the form of a through-hole bordered by a peripheral web. The peripheral web may be understood as an incomplete web (in the sense in which this term is used in connection with the first conformation referred to above). It materializes a cross section constriction which is advantageously centered on the remainder of the hole precursor and can be used to center correctly the tool for preparing a fixing hole in the wall to which the part must be fixed, or even the fixing member itself. Depending on its thickness, either the peripheral web is destroyed when fitting a fixing member or remains and constitutes a spot facing.

In a further, advantageous conformation, the geometry of the area rendered plastic is modified to delimit the mechanically weakened area by a contour made up of openings. This corresponds to forming "dashed lines" of openings around the contour of a hole obtained by breaking the residual areas of material linking the inside and the outside of the contour. The contour is preferably formed of through-openings, which facilitates breaking the residual connecting areas. However, the openings materializing the contour can instead be blind openings. In a further variant, the contour can be a contour of constant thickness less than the local thickness of the part (like a groove).

The method of the invention is of particular benefit if the thermoplastics material part is extruded. This is because the extrusion process produces a section of constant cross section and forming hole precursors necessarily requires specific operations.

Mechanically weakened areas can be produced after the extrusion process, exploiting the fact that the material of the section is still warm: the input of heat (or more generally of energy) to soften the plastics material locally can be reduced commensurately. To this end, the cycle of steps is advantageously carried out as the product is extruded. These steps can instead be carried out on sections previously cut to length.

The method of the invention is all the more beneficial when there is potentially a succession of hole precursors in the part; to this end, the cycle of steps is preferably reiterated to form a succession of hole precursors.

In a particularly advantageous embodiment of the invention the part is locally heated by means of a probe having one portion which constitutes the punch for modifying the geometry of the area rendered plastic. This represents the optimum from the thermal point of view (there are no thermal losses between the time at which the material is locally heated to the maximum temperature and the time at which the punch is applied), and the number of moving parts is minimized.

It is particularly advantageous if the heating probe is an ultrasound probe (sometimes referred to as a "sonotrode").

As already mentioned the shape of the punch determines that of the future hole precursor or hole.

A first embodiment of the punch has an end portion terminating in a plane transverse face; this produces a web at the bottom of the hole precursor whose thickness is in theory substantially constant.

A second embodiment of the punch has an end portion terminating in a transverse face incorporating at least one step. This provides a choice of a web closing off the whole of the future hole, with variations of thickness, or a through-hole precursor, forming a constriction bordered by a peripheral web or a hole bordered by a spot facing; the spot facing can itself be closed off by a web which is adapted to be broken.

The end portion can simply have a cylindrical cross section.

It can instead have an oblong cross section; in the case of a section, the punch is preferably oriented so that its greatest dimension is parallel to the longitudinal axis of the section; however, to give the maximum choice as to the location of the fixing members in the hole precursors, the orientation of the punch can be changed between forming two consecutive holes or hole precursors.

The end portion can simply have a constant cross section, but instead it can have a decreasing section; this produces holes or hole precursors which are easily penetrated by a tool or a fixing member from the side on which the hole or hole precursor is wider, without such insertion being as easy from the other side, or even possible.

In a further embodiment the end portion can terminate in a transverse (possibly concave) face bordered by a series of axial teeth extending in a closed line corresponding to the contour to be formed; it can instead terminate in a transverse face bordered by a continuous axial rim.

The invention also covers sections adapted to be made by the aforementioned method. It also provides a plastics material section incorporating a longitudinal succession of mechanically weakened areas forming holes or hole precursors.

Each mechanically weakened area is preferably in the form of a blind hole the bottom of which is constituted by a continuous web, which is favorable to obtaining a good seal between the two faces of the part.

In another embodiment each mechanically weakened area is in the form of a through-hole bordered by a peripheral web or spot facing, which can be of benefit from the centering point of view (even if its cross section is not circular, as the centering effect can be in the longitudinal direction only or in the transverse direction only).

In a further embodiment of the section each mechanically weakened area is delimited by a contour made up of a succession of openings.

The invention also covers the particular situation of electrical wiring trunking including a base portion and a cover, the base portion forming part of a section of the aforementioned type.

Objects, features and advantages of the invention will emerge from the following description which is given by way of illustrative and non-limiting example and with reference to the accompanying drawings.

BRIEF DESCRIPTION OF THE DRAWINGS

FIG. 1 is a view in cross section of a section during a first step of the method according to the invention.

FIG. 2 is a diagrammatic view in cross section of the section during a second step of the method.

FIG. 3 is a view in cross section of the finished section.

FIG. 4 is a view in cross section of the section at the beginning of a third step of the method.

FIG. 5 is a similar view at a slightly later stage.

FIG. 6 is a similar view at an end of punching stage, at which the section has a cross section as shown in FIG. 3.

FIG. 7 is a diagrammatic perspective view of the section shown in FIGS. 1 to 6.

FIG. 8 is a flowchart of one embodiment of the complete manufacturing process.

FIG. 9 is a view analogous to that of FIG. 6 corresponding to a different hole precursor shape.

FIG. 10 is a view analogous to that of FIG. 6 corresponding to a further hole precursor shape.

FIG. 11 is a perspective view of another example of a section having an oblong hole precursor.

FIG. 12 is a top view of the section shown in FIG. 11.

FIG. 13 is a view of this section in section taken along the line XIII—XIII in FIG. 12.

FIG. 14 is a view in cross section of another section in which another shaped hole or hole precursor is being formed.

FIG. 15 is a perspective view of this section in the finished state.

FIG. 16 is a top view of this section.

FIG. 17 is a view of this section in section taken along the line XVII—XVII in FIG. 16.

FIG. 18 is a perspective view of another section.

FIG. 19 is a top view of the section shown in FIG. 18.

FIG. 20 is a view in section taken along the line XX—XX in FIG. 19.

DETAILED DESCRIPTION OF THE PREFERRED EMBODIMENTS

FIGS. 1 to 3 show the principle of the process of the invention in the case of a section 10 in which a simple shape hole precursor (blind hole) is to be formed.

The section 10 has a wall 11 of constant thickness, but it must be understood that this is not a precondition of feasibility. To be more precise, the section has two flanges 12 and 13 bordering the wall 11, conjointly imparting a U-shaped cross section to the section. The section is advantageously intended to constitute the base portion of electrical wiring trunking (in which case the internal volume of the section is closed at the top by a cover, not shown, for example another U-shaped section, or another part of said section).

As shown in FIG. 1 the section 10 has already been made and has further undergone a drilling operation (throughout its local thickness) as a result of which it incorporates at least one through-opening 14 (such through-openings are preferably distributed all along the section).

FIG. 2 shows a subsequent step in the manufacture of the finished section, in which the section is locally heated to render an area of the section plastic.

In practice the heating is applied by means of a heating probe 15 shown only diagrammatically. However, the heating can instead be effected by any other means, for example by a wall along which the section travels.

In this example, the heating probe has a two-fold function in that it is also a punch which cooperates with a counter-punch 16, which can simply be a plane plate, to modify the geometry of the area rendered plastic so as to delimit within the section a mechanically weakened area constituting a hole or hole precursor. However, it must be understood that the punch could instead be separate from the source of energy causing the heating effect. The fact of using the probe as a punch in particular guarantees that the material all around the opening is rendered plastic (in practice the punch is aligned with the opening).

The hole precursor 20 is shown in FIGS. 3 and 7. Here it takes the form of a blind hole whose bottom is a continuous web 21 which closes off all of the section of the future hole. The surface of the web on the side opposite the blind hole is flush with the surface of the remainder of the section; this is because the counter-punch used is a plane plate, as mentioned above.

FIGS. 4 to 6 show three successive steps of the punching process during which the material of the part is shaped.

In FIG. 4 the punch 15, whose cross section is larger than that of the opening 14, is beginning to upset in a downward direction material that has been rendered viscous by the heating effect. FIG. 5 shows that this downward upsetting causes movement of the material under the punch corresponding to a constriction of the bottom part of the opening. FIG. 6 corresponds to the situation in which the punch has reached the end of its stroke and has caused the bottom part of the opening to be closed off.

Clearly, because the material is substantially incompressible, the space formed by the hole precursor has the same volume as the opening 14. The volume required of the opening 14 (if no increased thickness is to be formed) can easily be deduced from the known volume to be opened up by forming the hole precursor; the opening 14 is preferably drilled through, which in particular offers good control over the volume of the opening, with no risk of swarf remaining in it.

FIG. 8 is a highly schematic representation of an installation for implementing the method of the invention, with an extrusion station 25, a drilling station 26 and a heating and punching station 27 constituting a production line on which the drilling, heating and punching operations are carried out substantially at the exit from the extrusion station, which explains why the stations 26 and 27 are shown as being adapted to be moved parallel to the extrusion direction, so that they can act transversely (upward) on the moving section. The section obtained incorporates a succession of holes or hole precursors schematically represented in chain-dotted outline. The station 27 can have one element for heating and punching the plastics material or two separate elements close together (to reduce the cooling effect between heating and shaping or punching). The stations 26 and 27 can be joined together, i.e. conjointly constitute a single moving station, incorporating a plurality of tools acting in succession.

FIG. 9 shows another section 30 differing from the section 10 in terms of the shape of its hole precursor 34, which has a flared shape obtained by using a punch 32 whose end portion 33 is tapered rather than of constant cross section (like the punch 15). The hole precursor 34 has a trapezoidal cross section.

The punches 15 and 32 terminate in a plane transverse face.

FIG. 10 shows a punch 42 whose constant cross section end portion terminates in a transverse face incorporating a step 43. This produces a hole precursor 44 in the section 40 in the form of a blind hole whose bottom 45 has a lip 46 (intended to form a residual spot facing, for example).

FIG. 11 shows a section 50 having, like that shown in FIG. 7, a hole precursor 54 whose bottom is completely closed off. This hole precursor differs from the hole precursor shown in FIG. 7 in that its cross section is oblong, here being elongate in the extrusion direction. Note that a shape of this kind cannot be obtained directly by drilling. The punch 52 is preferably turned 90° between two successive hole precursors so that the latter have different orientations, even though they are formed by the same punch.

Referring to FIG. 10, if the downward movement of the punch were to continue, this would clearly produce either a spot-faced hole or a through-hole precursor with a bottom part of restricted cross section bordered by a peripheral web (in other words, the bottom 45 in FIG. 10 would be of zero thickness at the center).

Instead, the same geometry of the spot-faced hole or hole precursor (depending on the thickness of the rim 67) can be obtained in a section 60 by means of a punch 62 terminating in a plane transverse face and cooperating with a counter-punch 65 incorporating a projection 66. As explained above, the hole precursor 64 is a hole whose bottom part includes a constriction bordered by a peripheral web 67 or spot facing (a spot facing is thicker than a web).

FIGS. 18 to 20 correspond to another type of hole precursor 74 which, unlike the previous ones, has median portions which are not thin but instead materialized by a contour separating inside and outside portions of the same thickness (of course there can also be a difference in thickness). What follows is of course valid if a thin median portion is required.

FIGS. 18 and 19 therefore show a section 70 in which an annular series of narrow openings 71 is formed (any contour can be used, however); the openings conjointly form a hole precursor. As is clear from FIG. 20, the openings are through-openings in this example. They are formed by a punch 72 whose end portion terminates in a transverse face bordered by an annular series of teeth 73. The starter through-opening can in this case have a small cross section.

Various combinations of the shapes of the holes or hole precursors described are possible within the context of the invention.

The load on the source of energy for heating is greater if the part (whether it is a section or not) is at room temperature. In contrast, in FIG. 8, in which drilling and punching are performed on a production line, the energy input is reduced because the material of the section may not have cooled completely, being only just below its solidification threshold temperature.

The thermal energy source is preferably a probe (but can be a simple heating plate); it is advantageously an ultrasound probe (sonotrode), but any other appropriate heating element known in the art can be used, such as a heating spike.

Of course, the invention is not limited to extruded parts and can in particular be applied to thermoformed parts and even to injection-molded parts, in which case the invention enables holes or hole precursors to be formed without complicating the thermoforming or injection molding process, for example by avoiding the need for molding slides; this is particularly beneficial in the case of small series production which does not justify the production of complex and costly tooling.

There is claimed:

1. A method of manufacturing a part having at least one mechanically weakened area, said method including a step of producing a thermoplastics material part and at least one cycle of steps entailing forming a localized opening through an area of said part, heating said part locally by means of a heating probe so as to render said area of said part plastic, and using a punch to modify the geometry of said area rendered plastic so as to delimit in said part a mechanically weakened area constituting a hole or hole precursor.

2. The method claimed in claim 1 wherein said area rendered plastic surrounds said opening.

3. The method claimed in claim 1 wherein said geometry of said area rendered plastic is modified to delimit said mechanically weakened area in the form of a blind hole whose bottom is constituted by a continuous web.

4. The method claimed in claim 1 wherein said geometry of said area rendered plastic is modified to delimit said mechanically weakened area in the form of a through-hole bordered by a peripheral web over part of its height.

5. The method claimed in claim 1 wherein said geometry of said area rendered plastic is modified to delimit said mechanically weakened area by a contour formed of openings.

6. The method claimed in claim 5 wherein said contour is formed of through-openings.

7. The method claimed in claim 1 wherein said thermoplastics material part is extruded.

8. The method claimed in claim 7 wherein said cycle of steps is executed as said product is extruded.

9. The method claimed in claim 1 wherein said cycle of steps is reiterated to produce a succession of hole precursors.

10. The method claimed in claim 1 wherein said part is heated locally by means of a probe, part of which constitutes said punch for modifying said geometry of said area rendered plastic.

11. The method claimed in claim 1 wherein said heating probe is an ultrasound probe.

12. The method claimed in claim 1 wherein said punch has an end portion terminating in a plane transverse face.

13. The method claimed in claim 1 wherein said punch has an end portion terminating in a transverse face incorporating at least one step.

14. The method claimed in claim 12 wherein said end portion has a cylindrical section.

15. The method claimed in claim 12 wherein said end portion has an oblong section.

16. The method claimed in claim 13 wherein said end portion has a cylindrical section.

17. The method claimed in claim 13 wherein said end portion has an oblong section.

18. The method claimed in claim 1 wherein said end portion has a decreasing section.

19. The method claimed in claim 1 wherein said punch has an end portion terminating in a transverse face bordered by axial teeth.

* * * * *

UNITED STATES PATENT AND TRADEMARK OFFICE
CERTIFICATE OF CORRECTION

PATENT NO.     : 6,419,872 B1                                            Page 1 of 1
DATED          : July 16, 2002
INVENTOR(S)    : Jean-Jacques Claisse et al.

It is certified that error appears in the above-identified patent and that said Letters Patent is hereby corrected as shown below:

<u>Title page,</u>
Item [73], delete "Plant" and insert therefor -- Planet --.

Signed and Sealed this

Twenty-ninth Day of October, 2002

Attest:

Attesting Officer

JAMES E. ROGAN
*Director of the United States Patent and Trademark Office*